(12) United States Patent
Kawabe et al.

(10) Patent No.: US 9,457,757 B2
(45) Date of Patent: Oct. 4, 2016

(54) INTERLOCKING STRUCTURE, MOUNTING MEMBER, AND AIRBAG DEVICE

(71) Applicants: Takumi Kawabe, Saitama (JP); Shuhei Fujiwara, Saitama (JP); Keisuke Onohara, Tokyo (JP); Kouhei Nagashima, Tokyo (JP)

(72) Inventors: Takumi Kawabe, Saitama (JP); Shuhei Fujiwara, Saitama (JP); Keisuke Onohara, Tokyo (JP); Kouhei Nagashima, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 14/427,057

(22) PCT Filed: Sep. 9, 2013

(86) PCT No.: PCT/JP2013/074237
§ 371 (c)(1),
(2) Date: Mar. 10, 2015

(87) PCT Pub. No.: WO2014/050523
PCT Pub. Date: Apr. 3, 2014

(65) Prior Publication Data
US 2015/0239417 A1    Aug. 27, 2015

(30) Foreign Application Priority Data
Sep. 28, 2012    (JP) .................. 2012-218159

(51) Int. Cl.
*B60R 21/215*    (2011.01)
*B60R 13/00*    (2006.01)
*B60R 21/203*    (2006.01)

(52) U.S. Cl.
CPC .......... *B60R 21/215* (2013.01); *B60R 13/005* (2013.01); *B60R 21/203* (2013.01); *B60R 2021/21543* (2013.01)

(58) Field of Classification Search
CPC . B60R 13/005; B60R 21/203; B60R 21/215; B60R 2021/21543
USPC ....................................... 280/728.3
See application file for complete search history.

(56) References Cited

U.S. PATENT DOCUMENTS

| 5,678,851 | A | 10/1997 | Saito et al. | |
| 6,105,999 | A * | 8/2000 | Johnson | B60R 21/2165 280/727 |
| 6,568,704 | B2 * | 5/2003 | Iida | B60R 21/21656 280/728.3 |
| 6,692,016 | B2 * | 2/2004 | Yokota | B29C 45/14311 280/728.2 |
| 7,000,941 | B2 * | 2/2006 | Yokota | B29C 45/14311 280/728.2 |

(Continued)

FOREIGN PATENT DOCUMENTS

| JP | H08-301044 | 11/1996 |
| JP | H09-011833 | 1/1997 |

(Continued)

OTHER PUBLICATIONS

International Search Report mailed on Dec. 17, 2013.

*Primary Examiner* — Paul N Dickson
*Assistant Examiner* — Darlene Condra
(74) *Attorney, Agent, or Firm* — IPUSA, PLLC (57) ABSTRACT

A mounting member to be mounted to an obverse side of a cover part arranged at a central portion of a steering wheel includes corner parts 31a, 31b, 31c, and 31d having hook parts 36-3, 36-4, 36-5, and 36-6 protruding from their reverse sides, the hook parts 36-3, 36-4, 36-5, and 36-6 being capable of interlocking with holes formed at the cover part. The hook parts 36-3, 36-4, 36-5, and 36-6 are arranged at narrow parts 37a and 37b between a contour 33 of the mounting member 30 and openings 35a and 35b formed along the contour 33.

14 Claims, 6 Drawing Sheets

(56) References Cited

U.S. PATENT DOCUMENTS

| | | | |
|---|---|---|---|
| 7,004,497 B2* | 2/2006 | Thomas | B60R 21/21656 280/728.3 |
| 8,196,953 B2* | 6/2012 | Weigand | B60R 13/005 280/728.3 |
| 8,210,565 B2* | 7/2012 | Hayashi | B60R 21/21656 280/728.3 |
| 2001/0002965 A1 | 6/2001 | Ibe et al. | |
| 2001/0054810 A1* | 12/2001 | Sakane | B60Q 5/003 280/728.2 |
| 2003/0214120 A1* | 11/2003 | Iida | B60R 21/21656 280/728.3 |
| 2011/0062688 A1* | 3/2011 | Hayashi | B60R 21/21656 280/728.3 |
| 2014/0145419 A1* | 5/2014 | Ishikawa | B60R 21/215 280/728.3 |
| 2014/0210191 A1* | 7/2014 | Bosch | B60R 21/203 280/728.3 |
| 2015/0108742 A1* | 4/2015 | Bosch | B60R 21/203 280/728.3 |

FOREIGN PATENT DOCUMENTS

| | | |
|---|---|---|
| JP | H09-011838 | 1/1997 |
| JP | H09-048315 | 2/1997 |
| JP | H10-035389 | 2/1998 |
| JP | 2001-225703 | 8/2001 |
| JP | 2003-011764 | 1/2003 |
| JP | 2009-280059 | 12/2009 |

* cited by examiner

INTERLOCKING STRUCTURE, MOUNTING MEMBER, AND AIRBAG DEVICE

TECHNICAL FIELD

The present invention relates to technology for interlocking a mounting member that is mounted to an obverse side of a cover part.

BACKGROUND ART

For example, an airbag device for a driver's seat may be installed in a steering wheel for conducting automobile steering operations, and a mounting member such as an emblem of an automobile company may be mounted to the obverse side of a cover part of the airbag device. An exemplary technique for interlocking an emblem with a cover part is disclosed in Patent Document 1.

PRIOR ART DOCUMENTS

Patent Documents

Patent Document 1: Japanese Laid-Open Patent Publication No. H09-11833

SUMMARY OF THE INVENTION

Problems to be Solved by the Invention

However, depending on the means used to interlock a mounting member such as an emblem with the obverse side of a cover part of an airbag device, a large gap may be formed between a corner part of the mounting member and the cover part. Such a gap is preferably minimized for aesthetic reasons as well as practical reasons such as preventing the accumulation of dust.

An object of the present invention relates to providing an interlocking structure, a mounting member, and an airbag device that are capable of preventing enlargement of a gap formed between a cover part and a corner part of a mounting member that is mounted to an obverse side of the cover part.

Means for Solving the Problem

According to one embodiment of the present invention, an interlocking structure is provided that includes a cover part arranged at a central portion of a steering wheel, and a hook part protruding from a reverse side of a corner part of a mounting member that is mounted to an obverse side of the cover part. The hook part is interlocked with a hole formed in the cover part.

According to another embodiment of the present invention, a mounting member to be mounted to an obverse side of a cover part arranged at a central portion of a steering wheel is provided. The mounting member includes a corner part having a reverse side from which a hook part protrudes. The hook part can be interlocked with a hole formed in the cover part.

According to another embodiment of the present invention, an airbag device is provided that includes an airbag, a cover part that covers the airbag, and a mounting member that is mounted to an obverse side of the cover part. A hook part protruding from a reverse side of a corner part of the mounting member is interlocked with a hole formed in the cover part.

According to one preferred embodiment of the present invention, the hook part may be arranged at a narrow part between a contour of the mounting member and an opening formed along the contour.

According to another preferred embodiment of the present invention, the hook part may include a tip part that bends outward with respect to the mounting member when viewed facing the mounting member.

Advantageous Effect of the Invention

According to an aspect of the present invention, by providing an interlocking structure including a cover part that is arranged at a central portion of a steering wheel, and a hook part that protrudes from a reverse side of a corner part of a mounting member that is mounted to an obverse side of the cover part, wherein the hook part is interlocked with a hole formed in the cover part, a gap formed between the cover part and the corner part may be prevented from increasing in size. Also, even when the cover part is deformed due to heat, for example, the corner part may be prevented from flapping up from the cover part. Also, by preventing the gap between the cover part and the corner part from increasing in size, degradation in appearance due to the presence of the gap may be prevented, for example. Also, dust may be prevented from accumulating in the gap, for example.

Note that similar advantageous effects as described above may be obtained with respect to a mounting member that is mounted to an obverse side of a cover part arranged at a central portion of a steering wheel, which mounting member includes a corner part that has a hook part protruding from its reverse side, wherein the hook part is capable of being interlocked with a hole formed in the cover part.

Also, similar advantageous effects as described above may be obtained with respect to an airbag device including an airbag, a cover part that covers the airbag, and a mounting member that is mounted to an obverse side of the cover part, wherein a hook part protruding from a reverse side of a corner part of the mounting member is interlocked with a hole formed in the cover part.

Also, the hook part is preferably arranged at a narrow part between a contour of the mounting member and an opening formed along the contour. For example, the narrow part may be more easily deformed compared to other wider parts, and as such, the gap between the cover part and the narrow part may be enlarged more easily. However, by arranging the hook part at the narrow part, the gap formed between the cover part and the corner part may be prevented from being enlarged as a result of deformation of the narrow part, for example.

Also, the hook part preferably includes a tip part that bends outward with respect to the mounting member when viewed facing the mounting member. In this way, an outer peripheral portion of the mounting member may be more firmly held in contact with the cover part as compared with a case where the hook part is bent inward with respect to mounting member, for example.

EMBODIMENTS FOR IMPLEMENTING THE INVENTION

In the following, embodiments of the present invention are described with reference to the accompanying drawings.

[Configuration of Airbag Device 1]

Figure 1:
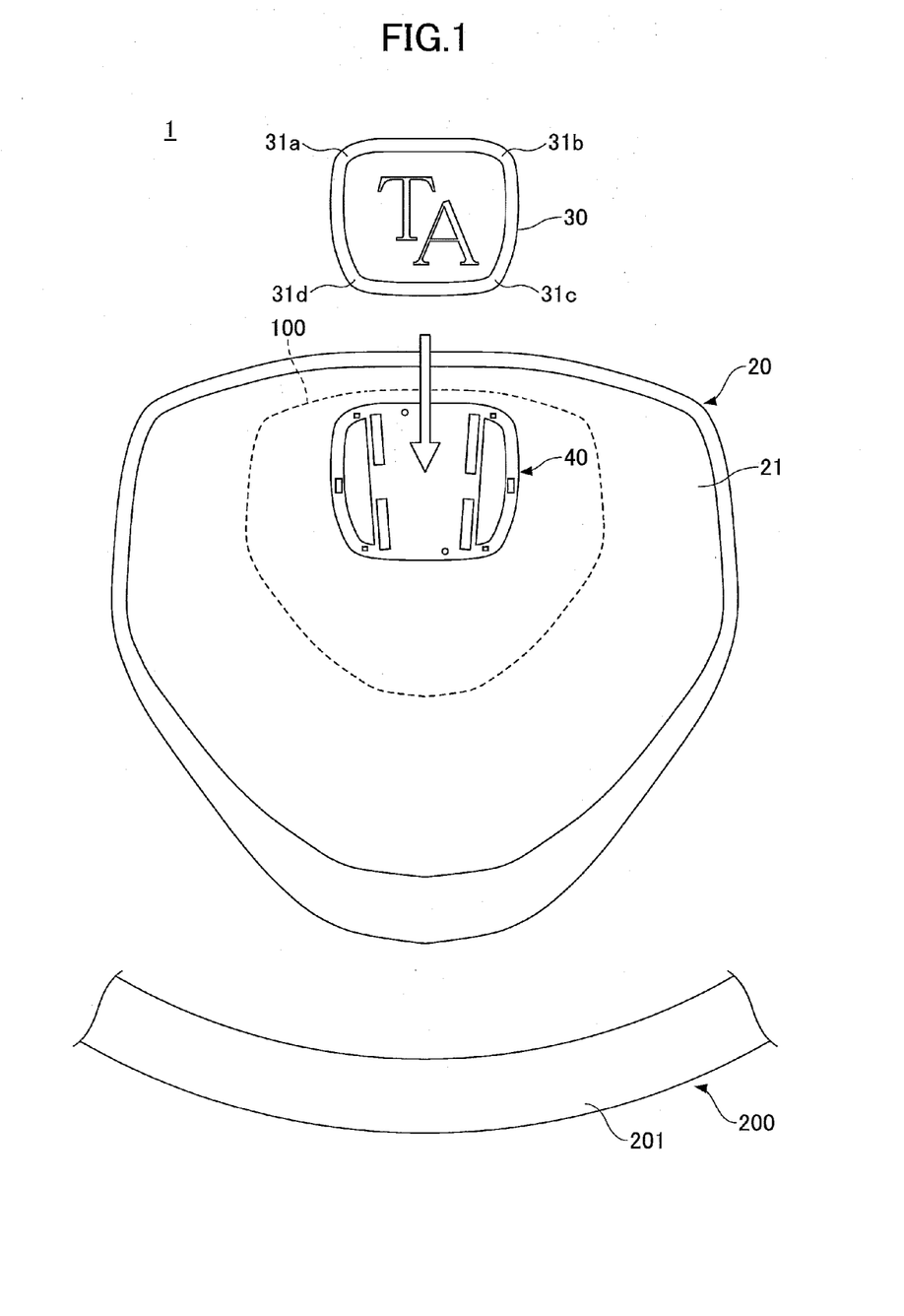
FIG. 1 illustrates an airbag device according to an embodiment of the present invention.

FIG. 1 illustrates an airbag device 1 according to an embodiment of the present invention. The airbag device 1 includes an airbag 100, a cover part 20, a mounting member 30, and a fastening member (the fastening member is described below with reference to another drawing). The airbag 100 is configured to be inflated by a gas supplied from an inflator (not shown) arranged in the airbag device 1 and is deployed with respect to an occupant by cleaving the cover part 20. The cover part 20 is fixed to a support member (not shown) arranged in the airbag device 1 and is configured to cover the airbag 100 that is folded and accommodated therein. The cover part 20 may be made of a resin material such as a thermoplastic elastomer. The mounting member 30 is a member that is mounted to an obverse side 21 of the cover part 20 and is visible by the occupant. Specific examples of the mounting member 30 include a decorative member such as an emblem of an automobile company. Note that the shape, size, and design of the mounting member 30 are by no way limited to the example illustrated in the drawings. A mounting part 40 to which the mounting member 30 is mounted is formed at a central portion of the obverse side 21 of the cover part 20.

Figure 2:
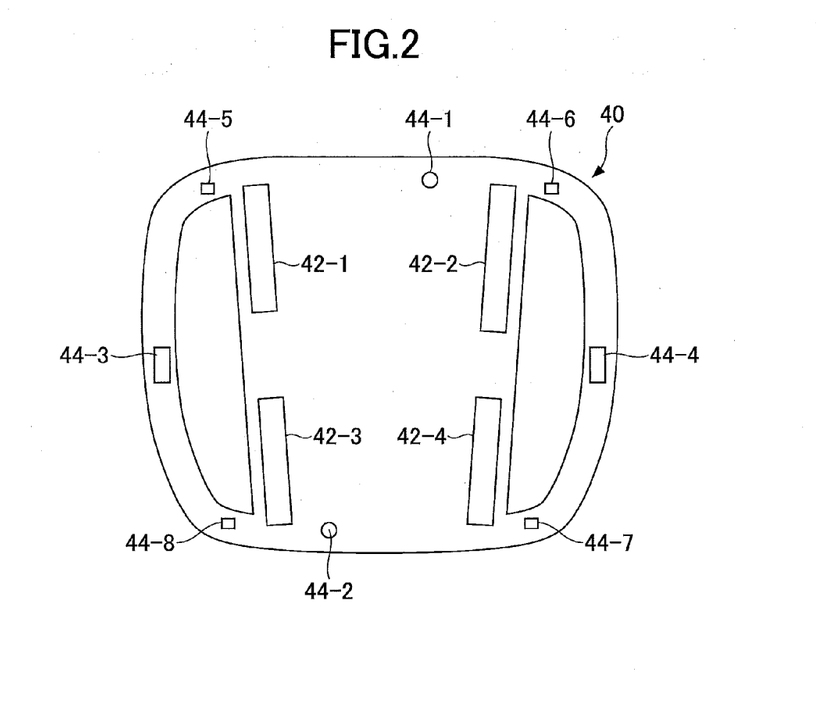
FIG. 2 is an enlarged view of a mounting part for a mounting member formed on a cover part of the airbag device.

FIG. 2 is an enlarged view of the mounting part 40 to which the mounting member 30 is mounted. The mounting part 40 of the cover part 20 includes rectangular-shaped mounting holes 42-1 to 42-4 into which U-shaped engaging parts 32-1 to 32-4 arranged at the mounting member 30 (described below) are inserted. The mounting holes 42-1 to 42-4 are arranged to penetrate through the cover part 20 from its obverse side to its reverse side. Also, circular and rectangular mounting holes 44-1 to 44-8 that penetrate through the cover part 20 from its obverse side to its reverse side surround the mounting holes 42-1 to 42-4.

[Configuration of Mounting Member 30]

Figure 3:
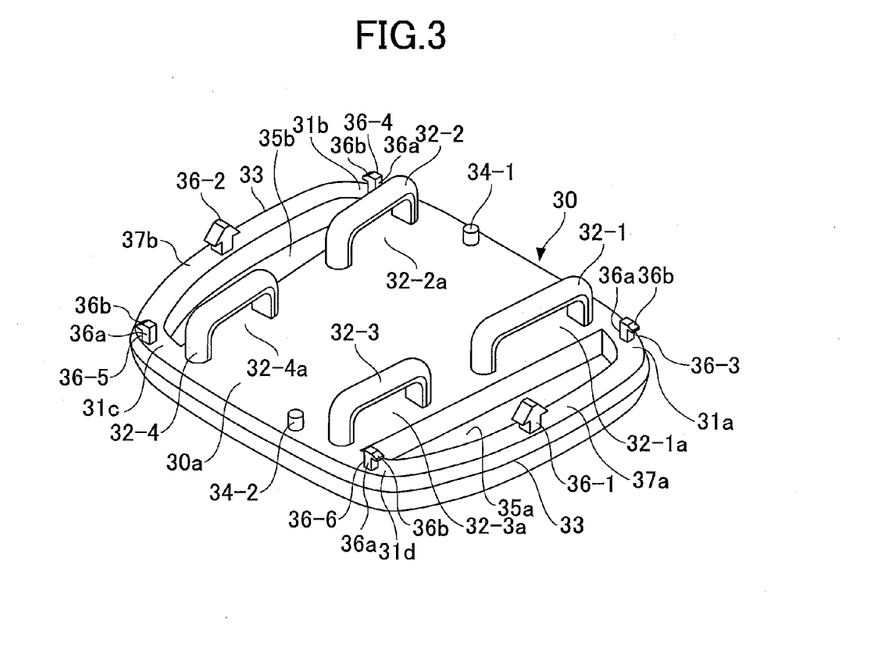
FIG. 3 is a perspective view from a reverse side of the mounting member.
Figure 4:
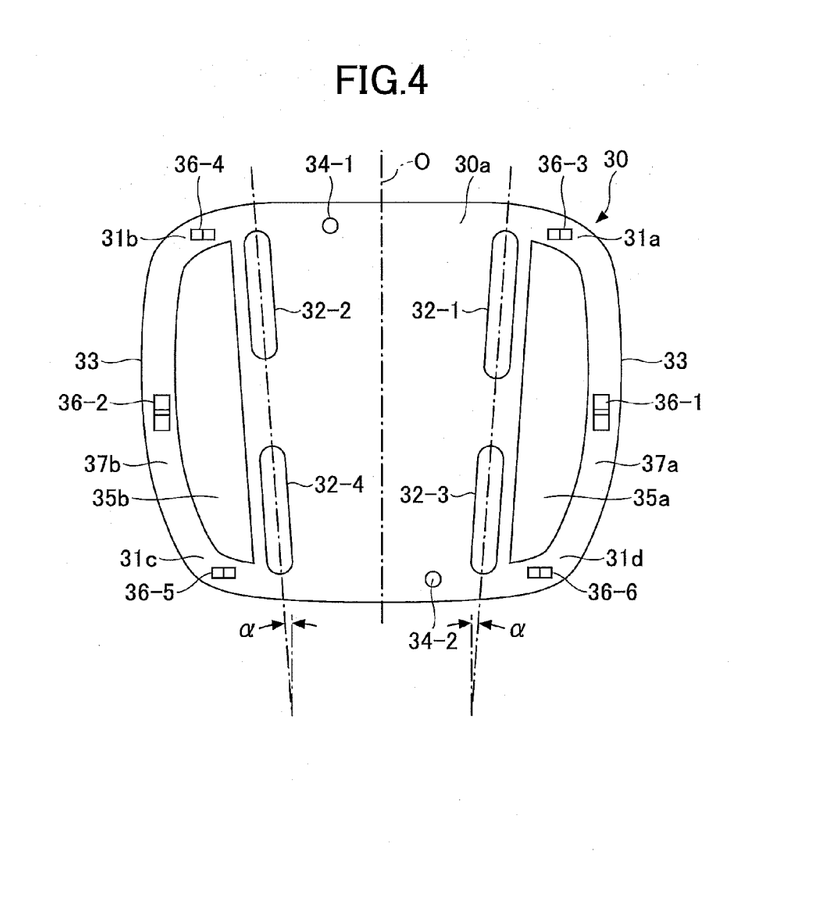
FIG. 4 is a bottom view of the mounting member.
Figure 5:
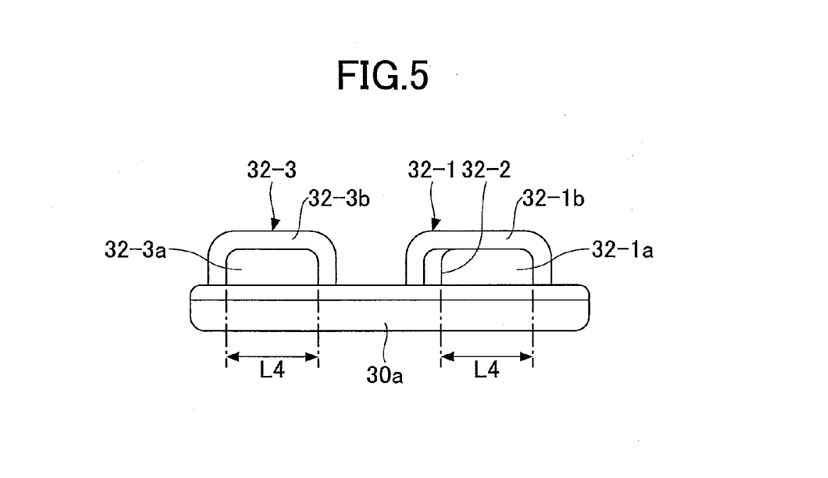
FIG. 5 is a right side view of the mounting member illustrated in FIG. 4.

FIG. 3 is a perspective view of the mounting member 30 from the reverse side. FIG. 4 is a bottom view of the mounting member 30 as viewed from the reverse side. FIG. 5 is a right side view of the mounting member 30 illustrated in FIG. 4.

The mounting member 30 may be made of a metal material such as a hairline-processed aluminum alloy, a resin material such as ABS resin (Acrylonitrile Butadiene Styrene Copolymer), or some other type of material.

The four U-shaped engaging parts 32-1 to 32-4 protrude from the reverse side of a base 30a of the mounting member 30. Positioning bosses 34-1 and 34-2 and hook parts 36-1 to 36-6 that engage the cover part 20 are arranged around the reverse side peripheral portion of the base 30a (not shown in FIG. 5). By inserting the positioning bosses 34-1 and 34-2 of the mounting member 30 into the mounting holes 44-1 and 44-2 of the mounting part 40 of the cover part 20 (see FIGS. 1 and 2), the mounting member 30 may be positioned with respect to the mounting part 40 of the cover part 20. Also, by interlocking the hook parts 36-1 to 36-6 arranged at six locations of the mounting member 30 with the mounting holes 44-3 to 44-8 of the mounting part 40 (see FIGS. 1 and 2), the reverse side of the mounting member 30 may be held in close contact with the mounting part 40.

The U-shaped engaging parts 32-1 to 32-4 are arranged into gate shapes that protrude from the reverse side of the mounting member 30. Fastening holes 32-1a to 32-4a to which a fastening member is inserted (described below) are formed between the U-shaped engaging parts 32-1 to 32-4 and the reverse side of the mounting member 30.

Also, as illustrated in FIG. 4, the U-shaped engaging parts 32-1 to 32-4, when viewed from the reverse side of the mounting member 30, are arranged to extend diagonally at a predetermined angle α with respect to a center line O extending in the longitudinal direction of the mounting member 30. In FIG. 4, the U-shaped engaging parts 32-1 and 32-2 are symmetrically arranged on the reverse side of the mounting member 30 with respect to the center line O, and the U-shaped engaging parts 32-3 and 32-4 are symmetrically arranged on the reverse side of the mounting member 30 with respect to the center line O.

The four hook parts 36-3 to 36-6 are arranged to protrude from the reverse side of four corner parts 31a to 31d of the mounting member 30 that has a rectangular shape. Note that although the contours of the illustrated corner parts 31a to 31d are rounded, the corner parts may also be angular. The hook parts 36-3 to 36-4 are preferably arranged to be symmetrically arranged with respect to the center line O such that the left and right locking strengths may be equal. Note that the same applies to the hook parts 36-5 and 36-6.

The hook parts 36-3 and 36-6, when viewed from the reverse side of the mounting member 30, are respectively arranged at the corner parts 31a and 31d that are located on one side of the center line O passing through the center of the mounting member 30. The corner parts 31a and 31b are arranged opposite the center line O with respect to the extending direction of the U-shaped engaging parts 32-1 and 32-3. On the other hand, the hook parts 36-4 and 36-5, when viewed from the reverse side of the mounting member 30, are respectively arranged at the corner parts 31b and 31c that are located on the other side of the center line O passing through the center of the mounting member 30. The corner parts 31b and 31c are arranged opposite the center line O with respect to the extending direction of the U-shaped engaging parts 32-2 and 32-4.

Also, in some cases, openings 35a and 35b may be formed in the mounting member 30 as illustrated in the drawings. In such case, the hook parts 36-3 to 36-6 arranged at the corner parts 31a-31d may be located at narrow parts 37a and 37b between the contour 33 of the mounting member 30 and the openings 35a and 35b formed along the contour 33, for example.

The openings 35a and 35b are holes formed in the mounting member 30 for design and/or cost reasons, for example, and may be through holes penetrating through the obverse and reverse sides of the mounting member 30 or recesses that do not penetrate through the mounting member 30. The openings 35a and 35b, when viewed from the reverse side of the mounting member 30, may be formed on the base 30a at the outer sides of the U-shaped engaging portions 32-1 to 32-4. The opening 35a extends from the corner part 31a to the corner part 31d that are located on one side of the center line O; and the opening 35b extends from the corner part 31b to the corner part 31c that are located on the other side of the center line O.

The narrow part 37a, when viewed from the reverse side of the mounting member 30, is a side peripheral portion between the contour 33 on one side of the center line O passing through the center of the mounting member 30 and the opening 35a extending along the contour 33 on this side. The narrow part 37b, when viewed from the reverse side of the mounting member 30, is a side peripheral portion between the contour 33 on the other side of the center line O passing through the center of the mounting member 30 and the opening 35b extending along the contour 33 on this other side.

Further, as illustrated in FIG. 3, the hook part 36-3 corresponding to one of the four hook parts includes a column part 36a protruding from the reverse side of the corner part 31a and a tip part 36b bending at the top of the column part 36a. The tip part 36b of the hook part 36-3, when viewed facing the reverse side or the obverse side of the mounting member 30, are bent outward with respect to the mounting member 30. That is, the tip part 36b is bent toward the contour 33 of the corner part 31a with respect to the position of the corner part 31a of the hook part 36-3. Note that the same applies to the configurations of the hook parts 36-4, 36-5, and 36-6.

In FIGS. 3 and 4, the tip parts 36b of the hook parts 36-3 to 36-6 are claw-like parts that are bent in one way in an outward direction with respect to the contour 33 of the mounting member 30 parallel to a direction perpendicular to the center line O (insertion direction of fastening members as described below). However, in other embodiments, the tip parts 36b of the hook parts 36-3 to 36-6 may be claw-like parts that are bent in one way in an outward direction with respect to the contour 33 of the mounting member 30 parallel to the center line O. Also, the tip parts 36b of the hook parts 36-3 to 36-6 may be claw-like parts bent in one way in an outward direction with respect to the contour 33 of the mounting member 30 parallel to a direction extending diagonally with respect to the center line O and the direction perpendicular to the center line O.

Also, in some embodiments, the tip parts 36b, when viewed from the obverse side or the reverse side of the mounting member 30, may protrude outward beyond the contour 33 of the corner parts 31a to 31d.

[Fastening Structure of Mounting Member 30]

Figure 6:
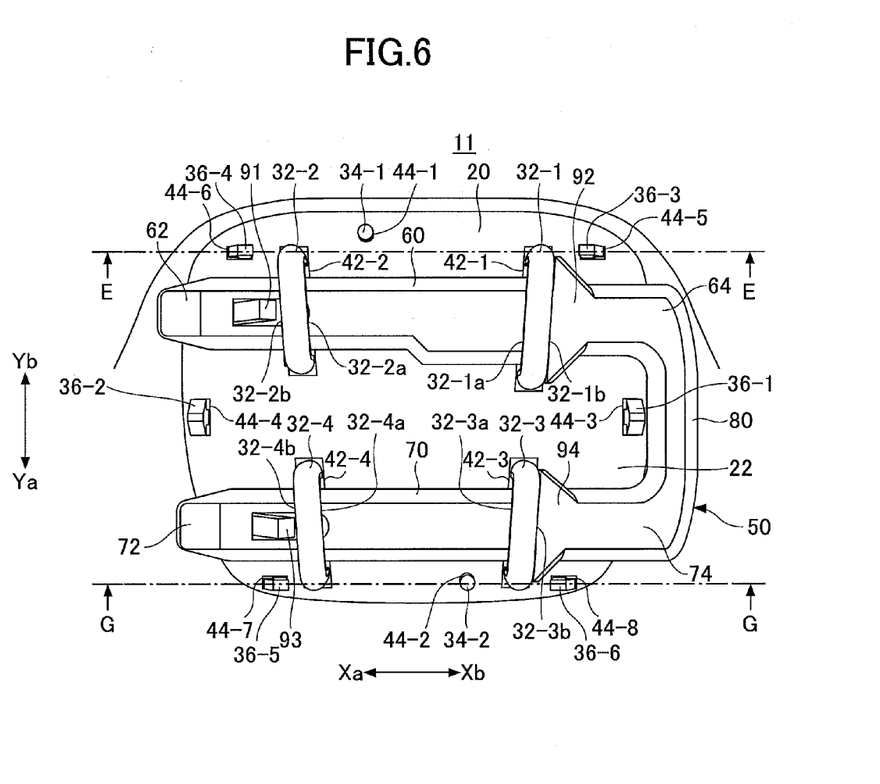
FIG. 6 illustrates an example of an interlocking structure.
Figure 7:
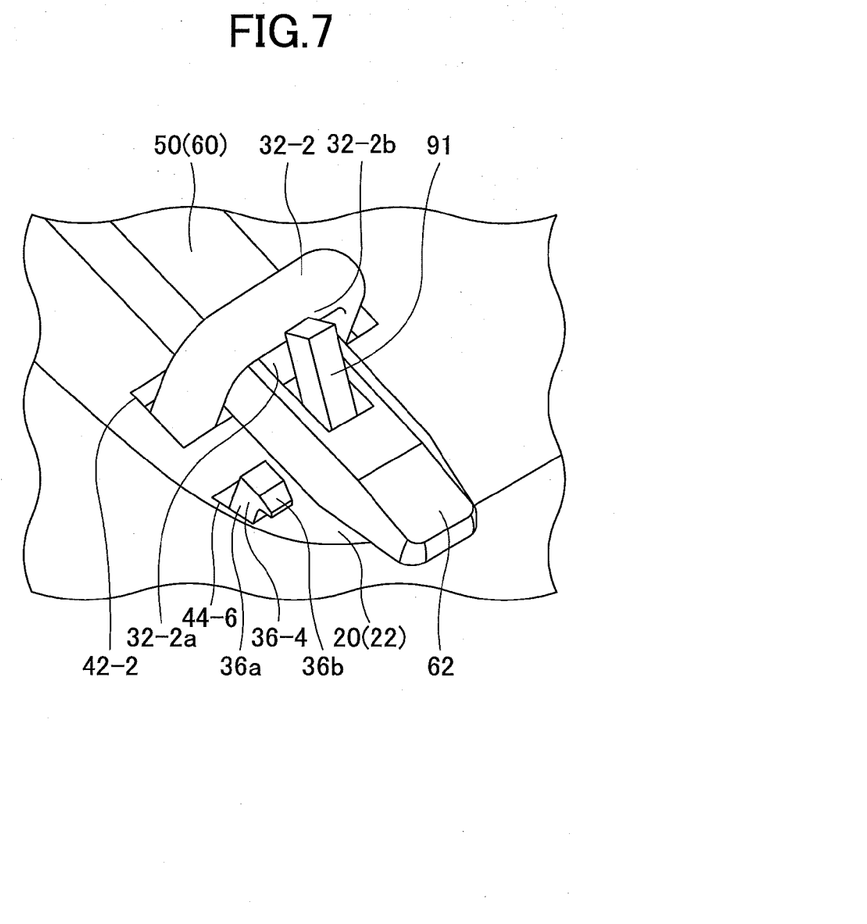
FIG. 7 is a partial enlarged view of FIG. 6.
Figure 8:
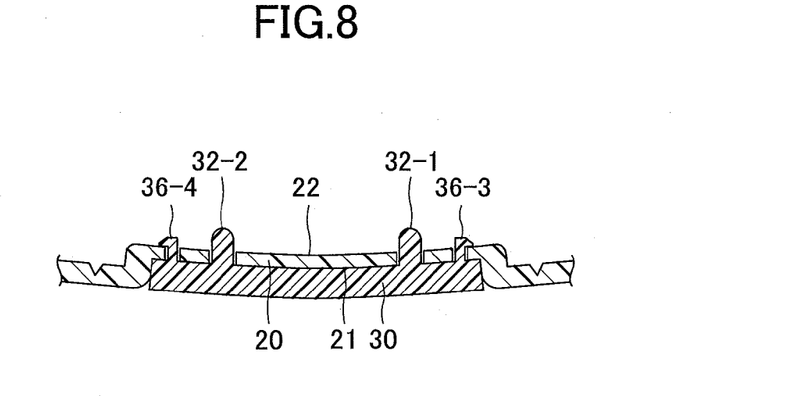
FIG. 8 is a cross-sectional view of FIG. 6.
Figure 9:
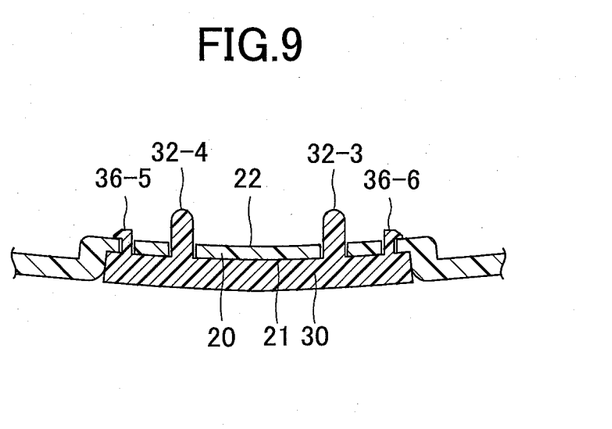
FIG. 9 is another cross-sectional view of FIG. 6.

FIG. 6 illustrates a fastening structure 11 as an embodiment of an interlocking structure according to the present invention. FIG. 7 is a partially enlarged view of the fastening structure 11. FIGS. 8 and 9 are cross-sectional views of parts of the fastening structure 11.

The fastening structure 11 includes the cover part 20, the U-shaped engaging parts 32-1 to 32-4 of the mounting member 30 that protrude from the reverse side 22 of the cover part 20, and a fastening member 50 that fastens the U-shaped engaging parts 32-1 to 32-4 of the mounting member 30 to the reverse side 22 of the cover part 20. Note that in the present embodiment, an exemplary case of mounting an emblem of an automobile company as the mounting member 30 to the obverse side of the cover part 20 is illustrated. However, the present invention may equally be applied to cases where a member other than an emblem is mounted to the cover part.

Also, to fasten the mounting member 30 mounted to the obverse side of the cover part 20, the so-called bolt structure is used in which first and second fastening parts 60 and 70 of the fastening member 50 are inserted through the fastening holes 32-1a to 32-4a of the U-shaped engaging parts 32-1 to 32-4 so that the U-shaped engaging parts 32-1 to 32-4 are fastened to the reverse side 22 of the cover part 20.

[Configuration of Fastening Member 50]

Figure 10:
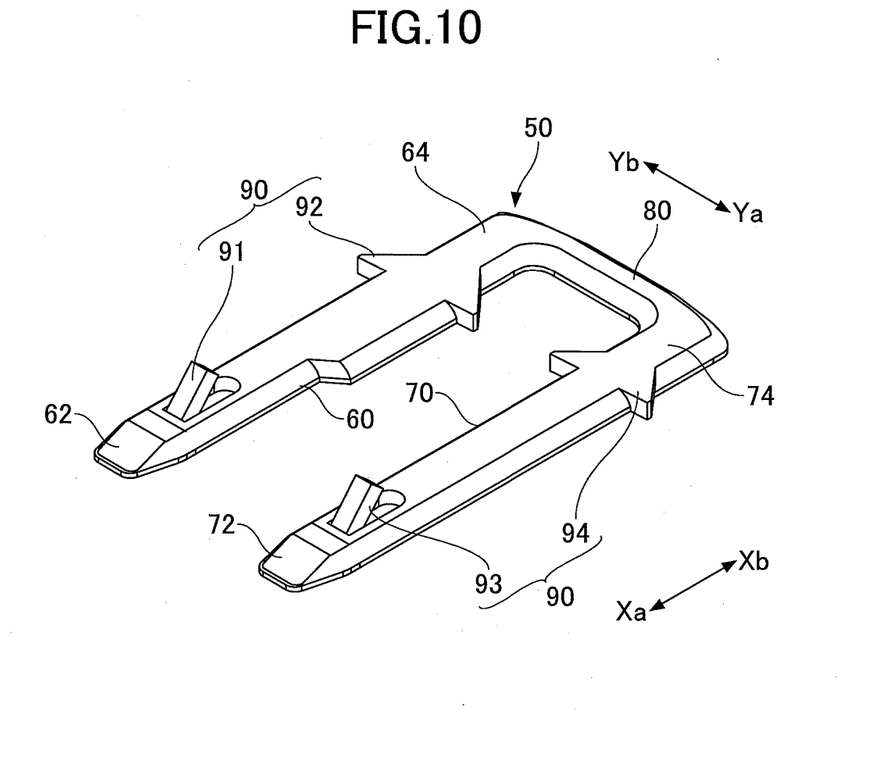
FIG. 10 is an upper-side perspective view of a fastening member.

FIG. 10 is an upper side perspective view of the fastening member 50.

The fastening member 50 may be formed by molding a thermoplastic resin, for example. As illustrated in FIG. 10, for example, the fastening member 50 includes the first and second fastening parts 60 and 70 that extend parallel to the X direction (Xa or Xb direction), a connecting part 80 that interconnects base end portions 64 and 74 of the first and second fastening parts 60 and 70, and detachment preventing parts 90 for preventing the first and second fastening parts 60 and 70 from coming off the U-shaped engaging parts 32-1 to 32-4.

The fastening member 50 is arranged into a C-shape (U-shape) by interposing the connecting part 80 between the base end portions 64 and 74 of the two fastening parts 60 and 70 that extend linearly in the X direction. However, by changing the shape of the connecting part 80, the fastening member 50 may be arranged into a shape other than a U-shape. Also, tip portions 62 and 72 of the first and second fastening parts 60 and 70 are tapered so that the first and second fastening parts 60 and 70 may be easily inserted into the fastening holes 32-1a to 32-4a of the U-shaped engaging parts 32-1 to 32-4.

The detachment preventing parts 90 include first contact parts 91 and 93 arranged near the tip portions 62 and 72 of the first and second fastening parts 60 and 70 and second contact parts 92 and 94 arranged near the base end portions 64 and 74 of the first and second fastening parts 60 and 70. The first contact parts 91 and 93 come into contact with side face portions 32-2b and 32-4b of the U-shaped engaging parts 32-2 and 32-4 (left side of FIG. 6), and the second contact parts 92 and 94 come into contact with side face portions 32-1b and 32-3b of the U-shaped engaging parts 32-1 and 32-3 (right side of FIG. 6).

[Method of Fastening Mounting Member 30 and Cover Part 20]

In the following, operation procedures for fastening the mounting member 30 and the cover part 20 using the fastening member 50 of the fastening structure 11 having the above-described configuration is described.

(Step 1) As shown in FIGS. 1-5, first, the mounting member 30 is mounted to the mounting part 40 formed on the obverse side of the cover part 20. At this time, the U-shaped engaging parts 32-1 to 32-4 of the mounting member 30 are inserted through the mounting holes 42-1 to 42-4 from the obverse side of the mounting part 40 to protrude from the reverse side of the mounting part 40. Also, the positioning bosses 34-1 and 34-2 and the hook parts 36-1 to 36-6 of the mounting member 30 are inserted into the mounting holes 44-1 to 44-8 of the mounting part 40 to be interlocked with the cover part 20 (first fastening operation).

By having the positioning bosses 34-1 and 34-2 inserted into the mounting holes 44-1 and 44-2, the mounting member 30 may be fixed into position with respect to longitudinal and lateral in-plane directions within a plane perpendicular to the mounting direction for mounting the mounting member 30 to the obverse side of the cover part 20 (plane parallel to the mounting surface of the mounting part 40). By having the hook parts 36-1 to 36-6 inserted into the mounting holes 44-3 to 44-8, the mounting member 30 may be fixed in position with respect to the cover part 20 in the mounting direction for mounting the mounting member 30 to the obverse side of the cover part 20 (normal direction to the mounting surface of the mounting part 40).

As illustrated in FIGS. 6-9, the column parts 36a of the hook parts 36-3 to 36-6 penetrate through the mounting holes 44-5 to 44-8 from the obverse side 21 to the reverse side 22 of the cover part 20, and the tip parts 36b are hooked and fixed to the reverse side 22 of the cover part 20.

(Step 2) Viewing the cover part 20 from its reverse side as illustrated in FIG. 6, the fastening member 50 has the first contact parts 91 and 93 oriented upward and the connecting part 80 positioned at the right side. By sliding the fastening member 50 in such a disposition toward the Xa direction, the tip portions 62 and 72 of the first and second fastening parts 60 and 70 are inserted from the right side into the fastening holes 32-1a and 32-3a of the U-shaped engaging parts 32-1 and 32-3 that protrude from the reverse side of the cover part 20.

(Step 3) The fastening member 50 is slid further in the Xa direction so that the tip portions 62 and 72 of the first and second fastening parts 60 and 70 are inserted from the right side into the fastening holes 32-2a and 32-4a of the U-shaped engaging parts 32-2 and 32-4 located at the left side of the cover part 20. During this insertion operation, the first contact parts 91 and 93 of the fastening member 50 slide against the inner peripheral faces of the fastening holes 32-2a and 32-4a of the U-shaped engaging parts 32-2 and 32-4 and bend in a direction close to the horizontal direction. After the end portions of the contact parts 91 and 93 slide past the fastening holes 32-2a and 32-4a of the U-shaped engaging parts 32-2 and 32-4, the end portions revert back to their original height and slope to come into contact with the side face portions 32-2b and 32-4b at the left side of the U-shaped engaging parts 32-1 and 32-3 as illustrated in FIG. 6. In this case, end faces of the second contact parts 92 and 94 of the fastening member 50 come into contact with the side face portions 32-1b and 32-3b at the right side of the U-shaped engaging parts 32-1 and 32-3 as illustrated in FIG. 6 (second fastening operation).

In this way, the fastening member 50 can firmly fasten the U-shaped engaging parts 32-1 to 32-4 of the mounting member 30 to the cover part 20 by the four bolt structures and prevent the mounting member 30 from coming off the cover part 20, and at the same time, the reverse side of the mounting member 30 may be stably held in close contact with the mounting part 40 of the cover part 20.

Further, the fastening member 50 is configured to restrict movement of the first contact parts 91 and 93 in the Xb direction with respect to the U-shaped engaging parts 32-2 and 32-4 and movement of the second contact parts 92 and 94 in the Xa direction with respect to the U-shaped engaging parts 32-1 and 32-3. In this way, the fastening member 50 can firmly fasten the U-shaped engaging parts 32-1 to 32-4 of the mounting member 30 to the cover part 20, and at the same time, the fastening member 50 may be prevented from coming off the U-shaped engaging parts 32-1 to 32-4 even when vibrations or a shock is applied, for example. Also, because the fastening operation of the fastening member 50 merely involves sliding the fastening member 50 in the Xa direction, workability during assembly may be improved and productivity may be increased, for example.

Also, when removing the fastening member 50, the first contact parts 91 and 93 may be pushed downward and pulled in the Xb direction at the same time so that the first contact parts 91 and 93 may pass through the U-shaped engaging parts 32-1 to 32-4 in the Xb direction. Thus, even when detaching the mounting member 30 from the cover part 20, the fastening member 50 may be removed without the use of special equipment and the mounting member 30 may be unfastened from the cover part 20 with relative ease.

Also, the hook parts 36-3 to 36-6 are respectively inserted into and interlocked with the corresponding mounting holes 44-5 to 44-8. In this way, gaps formed between the obverse side 21 of the cover part 20 and the corner parts 31a to 31d of the mounting member 30 may be prevented from being enlarged. Also, even when the cover part 20 is deformed due to heat, for example, the four corners of the mounting member 30 (corner parts 31a to 31d) may be prevented from flapping up from the obverse side 21 of the cover part 20 (toward the occupant side) (see FIG. 1 and FIGS. 6-9).

Also, the narrow parts 37a and 37ba that occur as a result of forming the openings 35a and 35b along the contour 33 of the mounting member 30 are easily deformed due to their reduced thickness. As such, gaps formed between the obverse side 21 of the cover part 20 and the narrow parts 37a and 37b are prone to increase in size. However, in the present embodiment, the hook part 36-1 is provided at a portion of the narrow part 37a between the corner parts 31a and 31d, and in this way, the gap at this portion may be prevented from increasing in size. The same effect may be obtained by the hook part 36-2. Also, in the present embodiment, the hook part 36-3 is provided at the corner part 31a of the narrow part 37a, and in this way, the gap at the corner part 31a may be prevented from increasing in size. The same effect may be obtained by the hook parts 36-4 to 36-6 as well.

Also, the tip parts 36b of the hook parts 36-3 to 36-6 are arranged to bend outward with respect to the mounting member 30, and in this way, the orientations of the tip parts 36b may substantially coincide with the curving direction of the mounting member 30 that has a curved shape with its central portion protruding from its outer peripheral portion as illustrated in FIGS. 8 and 9. Such an arrangement may further prevent the gaps between the obverse side 21 of the cover part 20 and the corner parts 31a to 31d from being enlarged.

Note that an interlocking structure, a mounting member, and an airbag device according to the present invention have been described above with respect to certain illustrative embodiments. However, the present invention is not limited to these embodiments, and various modifications and improvements may be made within the scope of the present invention including combinations and/or substitutions of the above embodiments with other embodiments.

For example, although an exemplary case of fastening an emblem to the cover part 20 has been described above as an illustrative example, the present invention may equally be applied to cases of mounting a member other than an emblem.

Also, although the airbag device 1 and the cover part 20 are arranged at a central portion of a steering wheel 200 (see FIG. 1) in the above-described embodiment, the arrangement of the airbag device and the cover part of the present invention is not limited to the above. For example, the present invention may also be applied to cases of mounting a mounting member to a cover part of an airbag device for a passenger seat that is installed in an instrument panel, an airbag device for a rear seat that is installed in a front seat, or an airbag device for protection against side collision that is installed in a side part of a vehicle body.

Also, although the cover part 20 described above is configured to cover the airbag 100, the cover part of the present invention is not limited to covering an airbag. That is, the cover part of the present invention may also be configured to cover other members such as a horn switch or a steering shaft. For example, in a vehicle specification that does not include an airbag for the driver's seat, the cover part 20 illustrated in FIG. 1, may be arranged at an inner central portion located radially within an annular rim part 201 of the steering wheel 200 and may be configured to cover a member such as a horn switch.

The rim part 201 is a part that is gripped by the driver, and in FIG. 1, only a lower portion of the annular rim part 201 is illustrated while other portions are omitted. The cover part 20 may be mounted to a spoke portion extending radially inward from the rim part 201 toward the inner central portion of the rim portion 201, or the cover part 20 may be mounted to a hub portion of the steering wheel 200 (connecting portion between the steering wheel 200 and the steering shaft), for example.

Also, although the fastening member 50 described above is configured to be inserted horizontally with respect to the vehicle body, the fastening member of the present invention may be inserted in any direction including a vertical direction and an oblique direction with respect to the vehicle body.

Also, the shape of the mounting member 30 does not necessarily have to be rectangular but may be some other polygonal shape having corners, for example.

The present application is based on and claims the benefit of priority of Japanese Patent Application No. 2012-218159 filed on Sep. 28, 2012, the entire contents of which are herein incorporated by reference.

DESCRIPTION OF THE REFERENCE NUMERALS 1 airbag device
11 fastening structure
20 cover part
21 obverse side
22 reverse side
30 mounting member
30a base
31a, 31b, 31c, 31d corner part
32-1 to 32-4 U-shaped engaging part
32-1a to 32-4a fastening hole
32-1b to 32-4b side face portion
33 contour
34-1, 34-2 positioning boss
35a, 35b opening
36-1 to 36-6 hook part
36a column part
36b tip part
37a, 37b narrow part
40 mounting part
42-1 to 42-4 mounting hole
44-1 to 44-8 mounting hole
50 fastening member
60 first fastening part
62, 72 tip portion
64, 74 base end portion
70 second fastening part
80 connecting part
90 detachment preventing part
91, 93 first contact part
92, 94 second contact part
100 airbag
200 steering wheel
201 rim part

The invention claimed is:

1. An interlocking structure comprising:
a cover part arranged at a central portion of a steering wheel;
a mounting member that is mounted to an obverse side of the cover part;
four hook parts protruding from a reverse side of the mounting member that is mounted to the obverse side of the cover part, each hook part protruding at a different corner of the mounting member;
a first engaging part protruding from the mounting member so as to form a first hole between the first engaging part and the mounting member;
a second engaging part protruding from the mounting member so as to form a second hole between the second engaging part and the mounting member; and
a fastening member that includes a first member, a second member, and a third member that connects the first member to the second member;
wherein the first member extends through the first hole and the second hole;
wherein each hook part is interlocked with a different hole formed in the cover part;
wherein each hook part includes a tip part that bends outward with respect to the mounting member when viewed facing the mounting member.

2. The interlocking structure as claimed in claim 1, wherein each hook part is arranged at a narrow part between a contour of the mounting member and an opening formed along the contour.

3. The interlocking structure as claimed in claim 1, wherein the cover part covers an airbag.

4. The interlocking structure as claimed in claim 1, wherein the first engaging part and the second engaging part are substantially aligned in a first direction passing through the first hole and the second hole.

5. The interlocking structure as claimed in claim 4, wherein the first member extends through the first hole and the second hole in a direction substantially aligned with the first direction.

6. The interlocking structure as claimed in claim 5, further comprising:
a third engaging part protruding from the mounting member so as to form a third hole between the first engaging part and the mounting member;
a fourth engaging part protruding from the mounting member so as to form a fourth hole between the second engaging part and the mounting member;
wherein the second member extends through the third hole and the fourth hole.

7. A mounting member to be mounted to an obverse side of a cover part arranged at a central portion of a steering wheel, the mounting member comprising:
a first engaging part protruding from the mounting member so as to form a first hole between the first engaging part and the mounting member;
a second engaging part protruding from the mounting member so as to form a second hole between the second engaging part and the mounting member; and
a fastening member that includes a first member, a second member, and a third member that connects the first member to the second member;
wherein the first member extends through the first hole and the second hole.

8. The mounting member as claimed in claim 7, wherein the first engaging part and the second engaging part are substantially aligned in a first direction passing through the first hole and the second hole.

9. The mounting member as claimed in claim 8, wherein the first member extends through the first hole and the second hole in a direction substantially aligned with the first direction.

10. The mounting member as claimed in claim 9, further comprising:
- a third engaging part protruding from the mounting member so as to form a third hole between the first engaging part and the mounting member;
- a fourth engaging part protruding from the mounting member so as to form a fourth hole between the second engaging part and the mounting member;
- wherein the second member extends through the third hole and the fourth hole.

11. An airbag device comprising:
- an airbag;
- a cover part that covers the airbag;
- a mounting member that is mounted to an obverse side of the cover part;
- a first engaging part protruding from the mounting member so as to form a first hole between the first engaging part and the mounting member;
- a second engaging part protruding from the mounting member so as to form a second hole between the second engaging part and the mounting member; and
- a fastening member that includes a first member, a second member, and a third member that connects the first member to the second member;
- wherein the first member extends through the first hole and the second hole; and
- wherein a hook part protruding from a reverse side of a corner part of the mounting member is interlocked with a hole formed in the cover part.

12. The airbag device as claimed in claim 11, wherein the first engaging part and the second engaging part are substantially aligned in a first direction passing through the first hole and the second hole.

13. The airbag device as claimed in claim 12, wherein the first member extends through the first hole and the second hole in a direction substantially aligned with the first direction.

14. The airbag device as claimed in claim 13, further comprising:
- a third engaging part protruding from the mounting member so as to form a third hole between the first engaging part and the mounting member;
- a fourth engaging part protruding from the mounting member so as to form a fourth hole between the second engaging part and the mounting member;
- wherein the second member extends through the third hole and the fourth hole.

* * * * *